US011035056B2

(12) United States Patent
Fan et al.

(10) Patent No.: US 11,035,056 B2
(45) Date of Patent: Jun. 15, 2021

(54) METHOD FOR IMPROVING QUALITY OF POLYESTER INDUSTRIAL YARN

(71) Applicant: JIANGSU HENGLI CHEMICAL FIBRE CO., LTD., Wujiang (CN)

(72) Inventors: Hongwei Fan, Wujiang (CN); Damao Yang, Wujiang (CN); Ye Zhang, Wujiang (CN); Fangming Tang, Wujiang (CN); Huirong Zhao, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 16/638,477

(22) PCT Filed: Jul. 27, 2018

(86) PCT No.: PCT/CN2018/097507
§ 371 (c)(1),
(2) Date: Feb. 12, 2020

(87) PCT Pub. No.: WO2019/114282
PCT Pub. Date: Jun. 20, 2019

(65) Prior Publication Data
US 2020/0263325 A1 Aug. 20, 2020

(30) Foreign Application Priority Data

Dec. 14, 2017 (CN) .......................... 201711340297.6

(51) Int. Cl.
*D01D 5/088* (2006.01)
*C08J 5/02* (2006.01)
(Continued)

(52) U.S. Cl.
CPC ................ *D01D 5/088* (2013.01); *C08J 5/02* (2013.01); *D01D 5/096* (2013.01); *D01F 6/62* (2013.01);
(Continued)

(58) Field of Classification Search
CPC ....................................................... D01D 5/088
(Continued)

(56) References Cited

U.S. PATENT DOCUMENTS 5,049,447 A * 9/1991 Shindo ...................... D01F 6/62
428/373
2003/0012835 A1* 1/2003 Faulenbach ............ D01D 5/092
425/72.2
(Continued)

FOREIGN PATENT DOCUMENTS

CN 202881461 U 4/2013
CN 203382866 U * 1/2014 ......... D01D 10/0481
(Continued)

OTHER PUBLICATIONS

Machine Translation JP2007197887MT (Year: 2007).*
(Continued)

*Primary Examiner* — Matthew J Daniels
*Assistant Examiner* — Wayne K. Swier
(74) *Attorney, Agent, or Firm* — Bayramoglu Law Offices LLC

(57) ABSTRACT

A method for improving the quality of a polyester industrial yarn is provided. First, in the cooling process of preparing a polyester industrial yarn prepared by polyester spinning, the longitudinal height is kept unchanged, and the cross-sectional area of the slow cooling chamber is enlarged. The chamber maintains the surface temperature of the spinneret by means of heat preservation, and then uses an oil agent containing 67.30-85.58 wt % crown ether in the oiling
(Continued)

process of polyester industrial yarn prepared by polyester spinning. Enlarging the cross-sectional area of the slow-cooling chamber refers to the cross section of the slow cooling chamber is changed from a circular shape to a rectangular shape while keeping the spinneret connected to the slow cooling chamber unchanged. The cleaning cycle of the spinneret is prolonged by 35-45%, the full package rate of polyester industrial yarn is larger than 99%.

9 Claims, 2 Drawing Sheets

(51) Int. Cl.
  *D01D 5/096* (2006.01)
  *D01F 6/62* (2006.01)
  *D01F 11/08* (2006.01)

(52) U.S. Cl.
  CPC ........... D01F 11/08 (2013.01); *C08J 2367/00* (2013.01); *D10B 2331/04* (2013.01)

(58) Field of Classification Search
  USPC ........................................ 264/211.14, 211.15
  See application file for complete search history.

(56) References Cited

U.S. PATENT DOCUMENTS

2008/0193656 A1* 8/2008 Lee .................. B82Y 30/00
                                                                427/385.5

2011/0086415 A1    4/2011 Tustison et al.

FOREIGN PATENT DOCUMENTS

| | | | | | |
|---|---|---|---|---|---|
| CN | 104451940 | A | | 3/2015 | |
| CN | 105648552 | A | | 6/2016 | |
| CN | 206545071 | U | * | 10/2017 | ............... D01D 5/28 |
| CN | 107893264 | A | | 4/2018 | |
| CN | 107904694 | A | | 4/2018 | |
| CN | 107937998 | A | | 4/2018 | |
| CN | 108130743 | A | | 6/2018 | |
| DE | 4014989 | A1 | * | 11/1991 | ............. D04H 3/005 |
| GB | 841632 | A | * | 7/1960 | ......... D01D 10/0481 |
| GB | 1229843 | A | * | 4/1971 | ............... D01D 5/28 |
| JP | 09268417 | A | * | 10/1997 | |
| JP | 2007197887 | A | * | 8/2007 | |

OTHER PUBLICATIONS

Machine Translation JPH09268417 (Year: 1997).*
Machine Translation DE4014989 (Year: 1991).*
Zhaorui Zeng et.al., Solid-Phase Microextraction Using Fused-Silica Fibers Coated with Sol-Gel-Derived Hydroxy-Crown Ether; Anal Chem 2001 73, 2429-2436 (Year: 2001).*
Machine Translation JP2007197887 (Year: 2007).*
Machine Translation CN203382866 (Year: 2014).*
Machine Translation CN206545071 (Year: 2017).*
Chengmin Jiang et. al. Increased solubility and fiber spinning of graphenide dispersions aided by crown-ethers Chem. Comm. 9, 2017 (Year: 2017).*

* cited by examiner

METHOD FOR IMPROVING QUALITY OF POLYESTER INDUSTRIAL YARN

CROSS REFERENCE TO THE RELATED APPLICATIONS

This application is the national phase entry of International Application No. PCT/CN2018/097507, filed on Jul. 27, 2018, which is based upon and claims priority to Chinese Patent Application No. 201711340297.6, filed on Dec. 14, 2017, the entire contents of which are incorporated herein by reference.

TECHNICAL FIELD

This invention belongs to the technical field of fiber production, and more particularly, relates to a method for improving quality of polyester industrial yarn.

BACKGROUND

Since the invention of polyethylene terephthalate (PET) fiber, it has been well-known and well-developed because of its excellent performance. Its production is also the top among all kinds of synthetic fiber. PET fiber shows the great performance including high breaking strength and elastic modulus, moderate resilience, excellent heat setting, good heat and light resistance, acid and alkali resistance and corrosion resistance. Moreover, the fabrics made of PET fiber has the features of crease resistance and stiffness. Thus, PET fiber is widely used in clothes making and home textiles.

Because most PET fibers have a small dielectric constant, a low moisture regains and a high coefficient of friction, spinning oil must be used in the spinning process. The main component of the spinning oil is surfactant which can form a directional absorption layer, also called oil film, on the surface of chemical fiber. The oil film can reduce the accumulation of the static charge caused by the friction of fibers, thus reduces the surface resistance of the fiber and increases the conductivity of the fiber. The oil film insulation fiber can also have a certain affinity for the fiber, so that it has a certain collection property without being scattered. In addition, the oil film also provides certain gliding property to the fiber, so that the fiber won't be damaged under friction, and the fiber can have a smooth and soft handle so that it can smoothly pass the winding, stretching, drying and other processes during spinning with the electrostatic effect eliminated during the process. It helps prevent causing undesirable phenomena such as wrapping on belt, rollers and cylinders. It reduces the occurrences of broken fiber and broken ends and guarantees the quality of fiber products. Since the oil film on the fiber surface will broke at high temperature, high speed and a certain pressure, the friction behaviour of the fiber will change, resulting in an increase in friction, causing other problems such as broken fiber and broken ends. The higher the strength of the oil film is, the more difficult it is to break, which is beneficial to the spinnability of the fiber. When the oil agent is uniformly adsorbed on the surface of the fiber, the oil film is uniformly distributed on the surface. The oil film spreads rapidly and evenly after the fiber is stretched. If the viscosity of the oil agent is too high, it is not helpful to spread and form oil film uniformly. In addition, with the development of high-speed, ultra-high-speed and multi-functional polyester fibers, people have higher and higher requirements on the heat resistance, viscosity, smoothness performance and antistatic properties. The performance of oil agents has vital influence on the quality of the fiber.

At present, heating the slow cooling zone is mainly used to ensure the slow cooling effect of the slow cooling zone. There are two main modes of heating the slow cooling zone, all of which are active heating. First, as shown in FIG. 1, the heat medium of the box is used. No more adjustments will be performed after the spinning temperature is determined, which is relatively passive and it is difficult to adapt to different application conditions. Another mode, as is shown in FIG. 2, using electric heating to heat, the setting temperature can be higher or lower than the box heating media, which is more flexible, and can be adjusted according to the real situations. However, the high temperature will increase the coking of the oligomer on the spinneret. If the temperature is lowered, such as cutting off the power supply to stop heating, much heat in the box will be transferred outside because the heater is usually made of the aluminium material with good heat transfer performance, which results in the condensation of the heating media along the edge of the box. Because the heat is insufficiently provided, the temperature of the spinning assembly is lowered and the melt flow performance is significantly decreased, which results in the product with a lot of problems such as broken fiber.

Moreover, in the process of the polycondensation reaction of ethylene terephthalate, especially in the formation of linear high polymers, linear and cyclic oligomers are also associated due to high temperature oxidative degradation. Cyclic oligomers are formed from the retraction and cyclization of intermediates during the condensation stage. About 70% of the cyclic oligomers are cyclic trimers, and the cyclic trimer has the features of easy aggregation, easy crystallization, high chemical and thermal stability. The formation of cyclic trimer will have the following effects on polyester processing: (1) will cause blocking of the spinning assembly, affect the service life of the melt filter and assembly related; (2) will cause precipitation during the heat setting of the fiber and deposition on the heat roller, which increases friction and makes heating process unevenly performed. (3) will cause the dye gathered around the cyclic trimer and attached to the surface of fiber, which causes the colour unevenly dyed and makes colour spots and colour stains occur, resulting in affecting the handle and colour performance of the fiber and textile produced with this method; meanwhile the cyclic oligomer fills the pipe and valve, which slows the flowing speed of the melt, causing the uneven dyeing and low reproducibility; (4) adhesion to the fiber surface causes difficulty in winding the yarn, and can cause yarn breakage and uneven thickness, which affects the mechanical properties such as the breaking strength and elongation at break of the fiber, which importantly affects the product quality.

In the spinning process of polyester industrial yarn, the large fineness of the polyester industrial yarn will cause the unevenness of spinning, and the uniformity of spinning has a certain influence on the related performance of the product, and the production of oligomers in the production process also affects the quality of the product.

Therefore, it is vital to provide a method for improving the quality of polyester industrial yarn which is uniform in spinning and effective in reducing oligomers.

SUMMARY

The primary object of this invention is to overcome the difficulty of improving the quality of the polyester industrial yarn, and an improving method of dyeing and spinning uniformly and effectively decreasing the production of oligomer. This invention introduces the use of oil agent containing crown ether. It can improve the heat resistance and the lubricity, and can improve the quality of the fiber. This invention increases the cross-sectional area of the chamber in slow cooling zone, and at the same time the slow cooling zone keeps the temperature of the spinneret by insulation. Due to the increase of the area of slow cooling chamber, the possibility of diffusion of the oligomer in fiber increases so that less oligomer is left on the spinneret. The cleaning cycle of spinneret is also shorter than other methods.

Accordingly, to achieve above mentioned objects, the present invention provides technical solutions including a method for improving the quality of polyester industrial yarn; firstly, in the cooling process of preparing the polyester industrial yarn out by spinning, keep the vertical height and enlarge the cross-sectional area of the slow cooling chamber; meanwhile, keep the surface temperature of the spinneret by insulation in the slow cooling chamber; afterwards, use the oil agent containing crown ether of 67.30-85.58 wt % in the oiling process of preparing the polyester industrial yarn.

Crown ether is a heterocyclic organic compound, and it has several ether groups. Crown ether surfactant has a better wetting ability than corresponding open chain compounds. Crown ether has good solubility enhancement. Though the salt compounds have a bad solubility in organic compounds, with the help of crown ether the salt compound can have a better solubility in the organic compounds. The ordinary polyester compounds or the polyether compounds in the oil agent have big intermolecular force due to the molecular weight and the effect of hydrogen bond, which causes bigger kinematic viscosity. With the help of crown ether, crown ether can help manage the relationship between oil agent and the polyester compounds or polyether compounds. The crown ether can enter the space between the molecular chain of polyester compounds or the polyether compounds, and decrease the intermolecular force, and can eventually decrease the viscosity of the oil agent. The antistatic agent used in oil agent can be classified into three categories, which are anionic, cationic, and amphoteric surfactant. Most of them contain metal ions or exist as salt. These facts can lead to the low compatibility between the antistatic agent and polyester compounds or the polyether compounds. With the help of crown ether, due to the salting-in effect, the compatibility between the antistatic and the polyester compounds or polyether compounds is improved, and thus the oil film of the oil agent has better intensity. This will help increase the stability and the holding capacity in spinning. The indexes of the oil agent are the overall performance, so the quantity of the crown ether needs to be controlled. With less crown ether, the heat resistance of the oil agent and the oil film strength can't be counted as an advantage. On the other hand, with too much crown ether, other indexes will be restrained.

Enlarging the cross-sectional area of the slow cooling chamber can help the oligomer in the fiber diffuse into the air and decrease the quantity of which stays on the spinneret. On the one hand, this prolongs the life cycle of spinneret. On the other hand, the decrease of oligomer importantly increased the performance of the product.

Meanwhile, the slow cooling chamber uses insulation to keep the surface temperature of the spinneret, which can improve the product quality and prevent the spinneret from affecting the product quality because of the low surface temperature and the decrease of the spinning uniformity resulting from the low temperature. The prior arts use heating to keep the spinneret temperature. On the one hand, it causes the waste of the energy. On the other hand, temperature controlling requires high precision to ensure the product quality, which means the stability is questionable.

As a preferred technological method.

The method of improving the quality of polyester industrial yarn as mentioned above, the cycle of cleaning the spinneret prolongs 35% to 45%, resulting in the full-package rate higher than 99%. The linear oligomer content decreases. Thus, the surface of the spinnerets becomes cleaner and at the same time the uniformity of spinning gets increased. This invention also uses the oil agent containing crown agent, which reduces the occurrence of broken filament and prevents drift filament. This makes the full package rate ≥99% and greatly improves the quality of the product.

The method of improving the quality of polyester industrial yarn as mentioned above, enlarging the slow cooling chamber refers to changing the cross-sectional are of the slow cooling chamber from circle to rectangle with keeping the spinneret attached to the slow cooling chamber unchanged. In the prior arts, the slow cooling chamber is a cylinder, and the cross-sectional area is a circle. Keeping the spinneret unchanged, the rectangle is relatively larger than the circle, which results in the volume enlarging 50%, and more oligomer diffusing faster.

The method of improving the quality of polyester industrial yarn as mentioned above, the slow cooling chamber is composed of the heat preserving board and the spacer. The heat preserving board is hanged in the bottom of the spinning box. Set a hollow chamber I in the heat preserving board, and the spacer is used to arrange the hollow chamber I into several slow cooling chambers. Each slow cooling chamber has a spinneret. Through using the spacer and differentiate the ingot number, one can prevent the silicon oil from interfering each other.

The method of improving the quality of polyester industrial yarn as mentioned above, the heat preserving board is a stainless-steel board filled with the insulation material which has the temperature resistance of 400° C. The thickness of the heat preserving board is 30 to 50 mm, and the wall thickness of the stainless-steel is 0.9 to 1.5 mm. With the premise of no deformation, the wall thickness of the stainless-steel needs to be controlled as small as we can in order to decrease the heat load caused by heat absorbed by the stainless-steel board and the heat medium of the box.

The insulation material as mentioned above is rock wool and ceramic fiber. The insulation material is not limited between the two materials. Other materials with the similar functions can also be used in this invention.

The spacer as mentioned above, has the thickness of 1 to 3 mm. The thickness of the spacer needs to be controlled as thin as we can.

The method of improving the quality of polyester industrial yarn as mentioned above, the multiple spinnerets in hollow chamber I are circular spinnerets. The multiple spinnerets have the same diameters and their circle centers are on the same line and neighbouring each other.

The hollow chamber I as mentioned above, has its cross-sectional area as rectangle. Its long side is the side which is parallel to the line of spinnerets' circle centers. Its short side is the one which is vertical to the long side.

Its long side as mentioned above is 1.2 times of diameters of the multiple spinnerets. Its short side is 1.7 times of the diameter of the spinneret.

The method of improving the quality of polyester industrial yarn as mentioned above, the heat preserving board is stacked above the thermal insulation board, and the thermal insulation board is made of the same material as the heat preserving board. In the thermal insulation board, the hollow chamber II is designed and hollow chamber II has the same cross-sectional area as the hollow chamber I.

The two edges of the cross-sectional area of the hollow chamber II coincide with the two short edges of the cross-sectional area of the hollow chamber I where the hollow chamber II connects to the hollow chamber I. The two edges of the hollow chamber II are longer than the two short edges of the hollow chamber I, which can help the two hollow chambers form a stair after the thermal insulation board and the heat preserving board stack together. The oligomer can diffuse easier. The thermal insulation board can prolong the length of no-wind zone, which can improve the fiber quality. There is no spacer in hollow chamber II, so the surface temperature of the spinneret won't be affected by the cold air outside.

The thermal insulation board as mentioned above has the thickness of 25 to 45 mm.

The method for improving the polyester industrial yarn as mentioned above, the oil agent as mentioned has the thermal weight loss of 15 wt % after heating at 200° C. for 2 hours. The crown ether has the features of higher volatilization point and better heat resistance, and the oil agent has better heat resistance performance after the crown ether is added.

The oil agent has a kinematic viscosity at $(50\pm0.01)°$ C. of 27.5 to 30.1 $mm^2/s$, and the oil has a kinematic viscosity of 0.93 to 0.95 $mm^2/s$ after use of an emulsion having a concentration of 10 wt %. The ability to reduce the viscosity of the oil is mainly due to the reduced viscosity of the crown ether itself and due to it is a beaded small molecule. After the crown ether is introduced in the oil agent, the crown ether is better compatible with the polyester compound or the polyether compound oil agent. In the oil agent, it can enter the molecular chain of the polyester compound or the polyether compound, erase the force between the molecular chains, thereby reduce the viscosity of the oil agent.

The oil film strength of the oil agent is 121-127N, and the oil film strength concentration of the oil agent in the prior art is generally about 110N, which is mainly because the antistatic agent of the chemical fiber oil agent mostly contains metal ions or exists in the form of salt, resulting in the antistatic agent has poor compatibility with the polyester compound or the polyether compound in the oil agent, and the crown ether can improve the oil film strength mainly by the salt dissolution effect after the addition of the crown ether, and the antistatic agent and the polyester compound or polyether compound are improved in the compatibility, which increases the strength of the oil film.

The surface tension of the oil agent is 23.2-26.8 cN/cm, and the specific resistance is $1.0\times10^8$-$1.8\times10^8$ $\Omega\cdot cm$;

After oiling, the static friction coefficient between fiber and fiber is 0.250-0.263, and the dynamic friction coefficient is 0.262-0.273;

After oiling, the coefficient of static friction between fiber and metal is 0.202-0.210, and the coefficient of dynamic friction is 0.320-0.332.

A method for improving the quality of polyester industrial yarn as described above, wherein the crown ether is 2-hydroxymethyl-12-crown-4, 15-crown-5 or 2-hydroxymethyl-15-crown-5;

The oil agent further comprises mineral oil, potassium phosphate salt, trimethylolpropane laurate and sodium alkyl sulfonate;

The mineral oil is one of mineral oils of 9#-17#;

The potassium phosphate salt is a potassium salt of lauryl phosphate, an isomeric tridecyl polyoxyethylene ether phosphate potassium salt or a tetradecyl alcohol phosphate potassium salt;

The sodium alkyl sulfonate is sodium dodecyl sulfate, sodium pentadecyl sulfonate or sodium hexadecane sulfonate;

When the oil agent is used, it is disposed in water to an emulsion having a concentration of 10 to 20% by weight.

A method for improving the quality of the polyester industrial yarn as described above, wherein the oil agent is prepared by uniformly mixing a crown ether with a potassium phosphate salt, a trimethylolpropane laurate and a sodium alkylsulfonate, and then adding the mineral to the mineral. The oil is uniformly stirred to obtain an oil agent; the amount of each component added is as follows:

Mineral oil 0-10 parts;
Trimethylolpropane laurate 0-20 parts;
Crown ether 70-100 parts;
Phosphate potassium salt 8-15 parts;
Sodium alkyl sulfonate 2-7 parts;

The mixing is carried out at a normal temperature, and the stirring temperature is 40 to 55° C., and the time is 1 to 3 hours.

Invention mechanism:

The oiling agent of the present invention is an oil agent having low viscosity, good heat resistance and high oil film strength. The higher viscosity of the oil agent in the prior art is mainly due to the fact that the oil agent contains ordinary polyester compounds or polyether compounds. Due to the large molecular weight and hydrogen bonding, the intermolecular effect of the compounds is manifested as kinematic viscosity. Larger, thus resulting in higher viscosity of the oil agent, the viscosity of the oil agent can be significantly reduced after the addition of the crown ether, mainly because the crown ether itself has a low viscosity and is a beaded small molecule, the crown ether is better compatible with the polyether. In the ester compound or polyether oil system, the molecular chain between the polyester compound or the polyether compound is simultaneously inserted to shield the interaction between the molecular chains, thereby reducing the viscosity of the oil system. The lower oil film strength of the oil agent in the prior art is mainly due to the fact that the antistatic agent of the chemical fiber oil agent mostly contains metal ions or exists in the form of a salt, which results in compatibility of the antistatic agent with the polyester compound or polyether in the oil agent. The poorness of the crown ether can increase the strength of the oil film mainly due to the salt-solubility effect of the crown ether, the compatibility of the antistatic agent with the polyester compound or the polyether, and the strength of the oil film. In addition, the crown ether has a higher volatilization point and excellent heat resistance stability, and the heat resistance of the oil agent after the introduction of the crown ether is also remarkably improved, and the use of the crown ether-containing oil agent of the present invention improves the oil. The heat resistance and lubricity of the agent improve the stability of the spinning and the processing properties of the fiber, thereby improving the quality of the product.

The invention changes the cross section of the slow cooling chamber from the current circular shape to the rectangular shape while maintaining the longitudinal height the same, which increases the cross-sectional area of the slow cooling chamber and expands the spinning oligomer dispersion. Meanwhile the heat preservation mode of the slow cooling chamber changes from the active heating type to the non-heating heat preservation type, which reduces the energy accumulation and reduces the accumulation amount and hardness of the oligomer on the high temperature spinneret. Through the improvement of these two aspects, the invention greatly prolongs the fiber-clearing cycle of the profiled section. In addition, the present invention can also superimpose a hollow heat insulation board under the heat insulation board, so that the hollow chamber inside the heat insulation board and the heat insulation board are formed into stairs, on the one hand, the length of the windless area is extended, and the other In terms of speeding up the diffusion rate of oligomers, it also plays a role in thermal insulation. Increasing the cross-sectional area of the slow cooling chamber, on the one hand, allows the oligomer in the fiber to further diffuse into the air, improving the performance of the fiber, and on the other hand, reducing the diffusion of the oligomer to the spinneret. The chance to extend the cleaning cycle of the spinneret. The slow cooling chamber maintains the surface temperature of the spinneret in a warm manner, further reducing the occurrence of the broken filament phenomenon.

Benefits:

(1) A method for improving the quality of polyester industrial yarn as introduced in this invention, the oiling agent containing crown ether when oiling has the features of low viscosity, good heat resistance, high oil film strength, good smooth performance, and good antistatic performance. These features improve the stability of spinning and the processing property of the fiber, which improves the quality of the fiber produced.

(2) A method for improving the quality of polyester industrial yarn as introduced in this invention, enlarges the cross-sectional area when cooling, and keeps the surface temperature of the spinneret by heat preservation. It helps improve the quality of the fiber, and it also prolongs the cleaning cycle, and reduce the occurrence of broken filament phenomenon.

(3) A method for improving the quality of polyester industrial yarn as introduced in this invention, largely improves the productivity. It changes the active heating in slow-cooling area to heat preservation type, which cut down the used energy and the electricity used by 13%.

(4) A method for improving the quality of polyester industrial yarn as introduced in this invention, is characterized by its convenience, low cost, and good economic benefit.

Wherein 1 is spinning box, 2 is spinning box gas phase heat medium, 3 is hollow chamber I, 4 is electrical heater, 5 is hollow chamber II, 6 is heat preserving board, and 7 is heat insulation board.

DETAILED DESCRIPTION OF THE EMBODIMENTS

Hereinafter, the present invention will be described in more detail by the following examples. It should be noticed that these examples are only for illustrating the present invention and are not intended to limit the scope of the present invention. In addition, it should be noticed that after reading the content of the present invention, those skilled in this field can make various modifications or changes to the present invention, and these equivalent forms also apply to the scope of the appended claims of this application.

EXAMPLE 1

A method for improving the quality of polyester industrial yarn as introduced in this invention, comprising the steps:

(1) Preparation of oiling agent for oiling: mix and stir 2-hydroxymethyl-12-crown-4 with potassium dodecyl phosphate, trimethylolpropane laurate and sodium dodecyl sulfate at room temperature, uniformly add to 9# mineral oil and uniformly stir at 40° C. for 1 hour to obtain an oil agent. The amount of each component added is counted by weight as follows: 9# mineral oil is 2 parts, 10 parts of trimethylolpropane laurate, 90 parts of 2-hydroxymethyl-12-crown-4, 8 parts of potassium salt of dodecyl phosphate, 3 parts of sodium dodecyl sulfonate. The crown ether in the prepared oil agent is 79.6 wt %, and the oil agent has excellent high temperature resistance. The heat loss after heat treatment at 200° C. for 2 hours is 14.5 wt %. The viscosity of the oil agent is relatively low, and the kinematic viscosity is 29.6 mm$^2$/s at the temperature of (50±0.01)° C. The kinematic viscosity of the emulsion prepared by dissolving the oil agent into water with the concentration of 10 wt % is 0.93 mm$^2$/s. The oil film strength of the oil agent is high, the oil film strength is 125N, and the surface tension of the oil agent is 24.8 cN/cm. The specific resistance is 1.3×10$^8$ Ω·cm. After oiling, the coefficient of static friction (μs) between fiber and fiber (F/F) is 0.255, the coefficient of dynamic friction (μd) is 0.266. After oiling, fiber and metal (F/M) Static friction coefficient (μs) is 0.203, the coefficient of dynamic friction (μd) is 0.320, and the prepared oil agent is disposed in water to be an emulsion having a concentration of 15% by weight when used.

Figure 3:
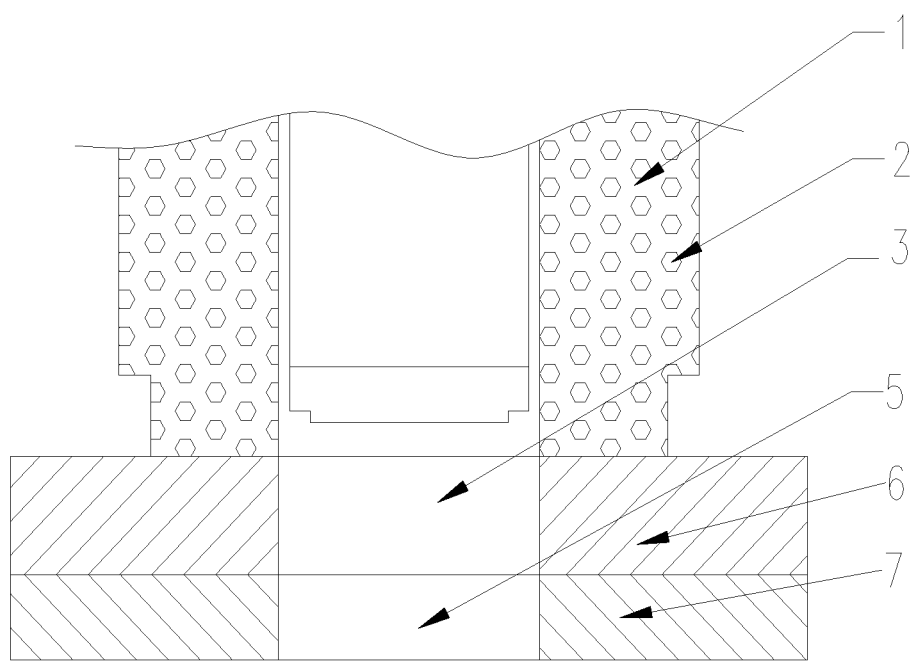
FIG. 3 is a schematic view of using heat preservation board to keep temperature in the box shape slow-cooling area of this invention.

(2) Polyester industrial yarn is prepared by spinning after cooling and oiling the polyester. When cooling, the schematic view of the slow cooling zone using heat preserving board is shown in FIG. 3. The heat preserving board 6 is embedded and hanged at the bottom of spinning box 1. There is gas phase heat medium 2 in spinning box 1. In the heat preserving board 6, there is a two-square hollow area like "回", and hollow chamber I 3 inside. The cross section of this chamber is rectangle, and its long side parallels with the connected line of the circle centre of the multiple spinnerets. The length of the long side equals to 1.2 times of the total length of diameters of the multiple spinnerets. The short side is vertical to the long side, and the length of it equals to 1.7 times of the diameter of spinneret. Spacers which is 1 mm thick are inserted into the hollow chamber I 3 in order to align the hollow chamber into multiple slow cooling chambers. Each slow cooling chamber has a circular spinneret. All the spinnerets line up by keeping their circle centers are on the same line and neighbouring each other. The heat preserving 6 is a stainless-steel board filled with rock wool having heat resistance of 400° C. The thickness of the heat preservation board is 30 mm, and the thickness of the stainless-board is 0.9 mm. Beneath the heat preservation board is a heat insulation board 7 whose thickness is 25 mm. The materials used in heat insulation board 7 is the same as the ones used in heat preservation board 6. Heat insulation board 7 has hollow chamber II 5, and hollow chamber II 5 has the same cross section as the hollow chamber I 3 has. The long sides of the cross section of the hollow chamber II 5 and hollow chamber I 3 have the same length.

At the position where the hollow chamber II 5 connects with the hollow chamber I 3, the two sides of the cross section of the hollow chamber II 5 respectively overlap the two short sides of the cross section of the hollow chamber I 3, and the lengths of the two sides are larger than the two short sides. As regard to the rectangular column slow cooling zone corresponding to the single circular spinneret uses the heat preserving board to preserve heat. The heat insulation board is embedded in the bottom of the spinning box, and the heat insulation board has a hollow chamber I, and the heat preserving board has a heat insulation board beneath. The heat insulation board also has a hollow chamber II. Where the hollow chamber I connects with hollow chamber II, the two sides of the cross section of the hollow chamber II respectively overlap with the two short sides of the cross section of the hollow chamber I, and the length of the two sides is greater than the two short sides. After overlapping the two heat preserving board, a stair-like shape is formed to accelerate the diffusion of the oligomer. Use the device introduced above to spin and produce the ultra-bright irregular cross-sectional shape fiber, and after the temperature of the heat preserving board and the box are sufficiently balanced, the temperature of the spinneret surface is detected, and the measured temperature is 260° C., which is higher than the spinning-required temperature 240° C. The device thus can provide smooth spinning experience, and the average clearing cycle is 32 hours.

Figure 1:
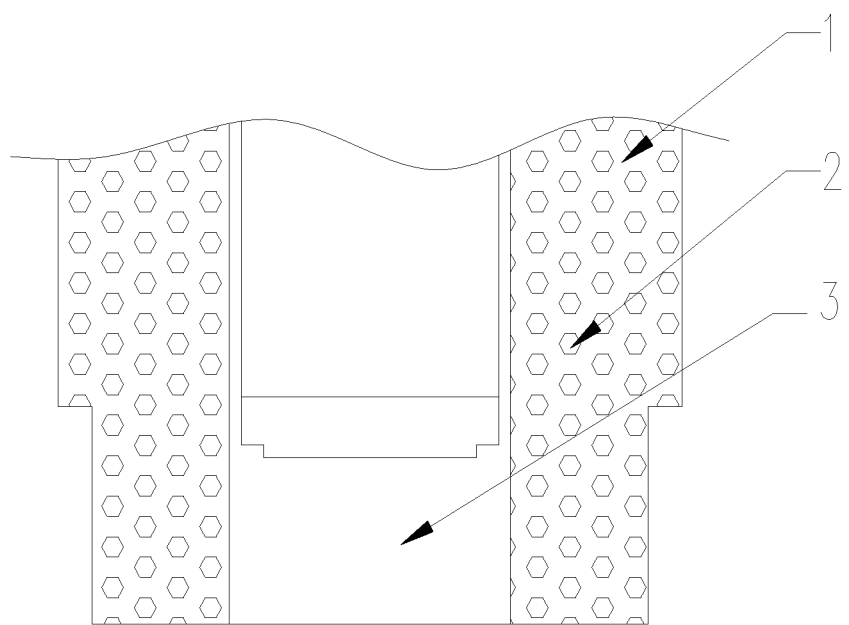
FIG. 1 is a schematic view of using gas phase heat medium heating in the cylinder slow-cooling area in prior arts.
Figure 2:
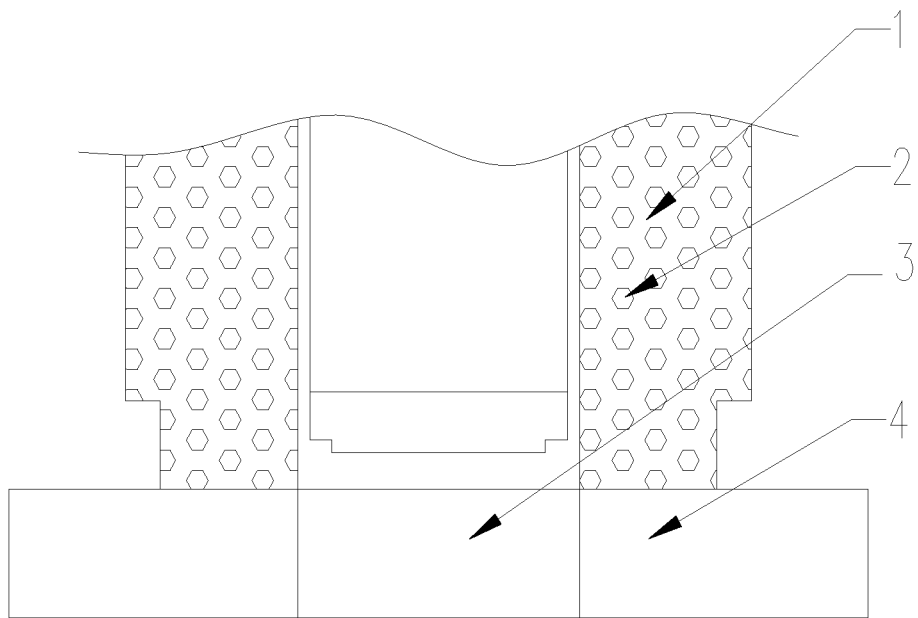
FIG. 2 is a schematic view of using electrical heating in the cylinder slow-cooling area in prior arts.

Compared to the cooling method of the slow cooling area in FIG. 2, the method used in this example actively uses heating to keep the temperature, and the slow cooling chamber is cylinder shape. The chamber is as high as the one in FIG. 3, which is 30 mm. The radius of the chamber is 51 mm, and the electrical heater 4 is used to heat the slow cooling chamber. The procedure provided above prolongs the cleaning cycle by 45%, and the full-package rate of the polyester industrial yarn produced is 99.9%.

EXAMPLE 2

A method for improving the quality of polyester industrial yarn as introduced in this invention, comprising the steps:

(1) Preparation of oiling agent for oiling: mix and stir 15-crown-5 and isomeric tridecanol polyoxyethylene ether phosphate potassium salt, trimethylolpropane laurate and sodium pentadecyl sulfonate at room temperature, uniformly add to 10# mineral oil and uniformly stir at 43° C. for 1.5 hour to obtain an oil agent. The amount of each component added is counted by weight as follows: 10# mineral oil is 2 parts, 15 parts of trimethylolpropane laurate, 70 parts of 15-crown-5, 10 parts of isomeric tridecanol polyoxyethylene ether phosphate potassium salt, 7 parts of sodium pentadecyl sulfonate. The crown ether in the prepared oil agent is 67.30 wt %, and the oil agent has excellent high temperature resistance. The heat loss after heat treatment at 200° C. for 2 hours is 13 wt %. The viscosity of the oil agent is relatively low, and the kinematic viscosity is 28.1 mm$^2$/s at the temperature of (50±0.01)° C. The kinematic viscosity of the emulsion prepared by dissolving the oil agent into water with the concentration of 10 wt % is 0.93 mm$^2$/s. The oil film strength of the oil agent is high, the oil film strength is 123N, and the surface tension of the oil agent is 25.1 cN/cm. The specific resistance is 1.5×10$^8$ Ω·cm. After oiling, the coefficient of static friction (μs) between fiber and fiber (F/F) is 0.257, the coefficient of dynamic friction (μd) is 0.265. After oiling, fiber and metal (F/M) Static friction coefficient (μs) is 0.205, the coefficient of dynamic friction (μd) is 0.323, and the prepared oil agent is disposed in water to be an emulsion having a concentration of 14% by weight when used.

(2) Polyester industrial yarn is prepared by spinning after cooling and oiling the polyester. When cooling, the structure of the device used in slow cooling area is basically the same as the one used in Example 1. The difference is in this example, the spacer's thickness is 2 mm, and the heat preserving board is filled with ceramic fiber. The ceramic fiber has the hear resistance of 405° C. The thickness of heat preserving board is 40 mm, and the thickness of the stainless-steel is 1.2 mm, the thickness of the heat insulation board is 35 mm.

The procedure provided above prolongs the cleaning cycle by 40%, and the full-package rate of the polyester industrial yarn produced is 99.5%.

EXAMPLE 3

A method for improving the quality of polyester industrial yarn as introduced in this invention, comprising the steps:

(1) Preparation of oiling agent for oiling: mix and stir 2-hydroxymethyl-15-crown-5 and twelve-tetradecyl phosphate potassium salt, trimethylolpropane laurate and sodium pentadecyl sulfonate at room temperature, uniformly add to 11# mineral oil and uniformly stir at 48° C. for 3 hours to obtain an oil agent. The amount of each component added is counted by weight as follows: 11# mineral oil is 8 parts, 10 parts of trimethylolpropane laurate, 85 parts of 2-hydroxymethyl-15-crown-5, 11 parts of twelve-tetradecyl phosphate potassium salt, 5 parts of sodium pentadecyl sulfonate. The crown ether in the prepared oil agent is 70.83 wt %, and the oil agent has excellent high temperature resistance. The heat loss after heat treatment at 200° C. for 2 hours is 11 wt %. The viscosity of the oil agent is relatively low, and the kinematic viscosity is 30.1 mm$^2$/s at the temperature of (50±0.01)° C. The kinematic viscosity of the emulsion prepared by dissolving the oil agent into water with the concentration of 10 wt % is 0.94 mm$^2$/s. The oil film strength of the oil agent is high, the oil film strength is 125N, and the surface tension of the oil agent is 23.2 cN/cm. The specific resistance is 1.8×10$^8$ Ω·cm. After oiling, the coefficient of static friction (μs) between fiber and fiber (F/F) is 0.250, the coefficient of dynamic friction (μd) is 0.272. After oiling, fiber and metal (F/M) Static friction coefficient (μs) is 0.209, the coefficient of dynamic friction (μd) is 0.329, and the prepared oil agent is disposed in water to be an emulsion having a concentration of 14% by weight when used.

(2) Polyester industrial yarn is prepared by spinning after cooling and oiling the polyester. When cooling, the structure of the device used in slow cooling area is basically the same as the one used in Example 1. The difference is in this example, the spacer's thickness is 3 mm, and the heat preserving board is filled with rock wool. The rock wool has the hear resistance of 410° C. The thickness of heat preserving board is 50 mm, and the thickness of the stainless-steel is 1.5 mm, the thickness of the heat insulation board is 45 mm.

The procedure provided above prolongs the cleaning cycle by 35%, and the full-package rate of the polyester industrial yarn produced is 99%.

EXAMPLE 4

A method for improving the quality of polyester industrial yarn as introduced in this invention, comprising the steps:

(1) Preparation of oiling agent for oiling: mix and stir 2-hydroxymethyl-12-crown-4 and potassium dodecyl phosphate, trimethylolpropane laurate and sodium hexadecyl sulfonate at room temperature, uniformly add to 12# mineral oil and uniformly stir at 40° C. for 2.5 hours to obtain an oil agent. The amount of each component added is counted by weight as follows: 12# mineral oil is 5 parts, 95 parts of 2-hydroxymethyl-12-crown-4, 9 parts of potassium dodecyl phosphate, 2 parts of sodium hexadecyl sulfonate. The crown ether in the prepared oil agent is 85.58 wt %, and the oil agent has excellent high temperature resistance. The heat loss after heat treatment at 200° C. for 2 hours is 9 wt %. The viscosity of the oil agent is relatively low, and the kinematic viscosity is 29.5 mm$^2$/s at the temperature of (50±0.01)° C. The kinematic viscosity of the emulsion prepared by dissolving the oil agent into water with the concentration of 10 wt % is 0.93 mm$^2$/s. The oil film strength of the oil agent is high, the oil film strength is 121N, and the surface tension of the oil agent is 24.3 cN/cm. The specific resistance is 1.0×10$^8$ Ω·cm. After oiling, the coefficient of static friction (μs) between fiber and fiber (F/F) is 0.260, the coefficient of dynamic friction (μd) is 0.263. After oiling, fiber and metal (F/M) Static friction coefficient (μs) is 0.202, the coefficient of dynamic friction (μd) is 0.330, and the prepared oil agent is disposed in water to be an emulsion having a concentration of 19% by weight when used.

(2) Polyester industrial yarn is prepared by spinning after cooling and oiling the polyester. When cooling, the structure of the device used in slow cooling area is basically the same as the one used in Example 1. The difference is in this example, the spacer's thickness is 1.5 mm, and the heat preserving board is filled with ceramic fiber. The ceramic fiber has the hear resistance of 407° C. The thickness of heat preserving board is 32 mm, and the thickness of the stainless-steel is 1.0 mm, the thickness of the heat insulation board is 32 mm.

The procedure provided above prolongs the cleaning cycle by 38%, and the full-package rate of the polyester industrial yarn produced is 99.3%.

EXAMPLE 5

A method for improving the quality of polyester industrial yarn as introduced in this invention, comprising the steps:

(1) Preparation of oiling agent for oiling: mix and stir 15-crown-5 and isomeric tridecanol polyoxyethylene ether phosphate potassium salt, trimethylolpropane laurate and sodium dodecyl sulfate at room temperature, uniformly add to 13# mineral oil and uniformly stir at 52° C. for 2 hours to obtain an oil agent. The amount of each component added is counted by weight as follows: 13# mineral oil is 10 parts, 5 parts of trimethylolpropane laurate, 70 parts of 15-crown-5, 6 parts of isomeric tridecanol polyoxyethylene ether phosphate potassium salt, 6 parts of sodium dodecyl sulfate. The crown ether in the prepared oil agent is 70.70 wt %, and the oil agent has excellent high temperature resistance. The heat loss after heat treatment at 200° C. for 2 hours is 13.5 wt %. The viscosity of the oil agent is relatively low, and the kinematic viscosity is 28.6 mm$^2$/s at the temperature of (50±0.01)° C. The kinematic viscosity of the emulsion prepared by dissolving the oil agent into water with the concentration of 10 wt % is 0.95mm$^2$/s. The oil film strength of the oil agent is high, the oil film strength is 126N, and the surface tension of the oil agent is 24.9 cN/cm. The specific resistance is 1.2×10$^8$ Ω·cm. After oiling, the coefficient of static friction (μs) between fiber and fiber (F/F) is 0.251, the coefficient of dynamic friction (μd) is 0.262. After oiling, fiber and metal (F/M) Static friction coefficient (μs) is 0.202, the coefficient of dynamic friction (μd) is 0.332, and the prepared oil agent is disposed in water to be an emulsion having a concentration of 11% by weight when used.

(2) Polyester industrial yarn is prepared by spinning after cooling and oiling the polyester. When cooling, the structure of the device used in slow cooling area is basically the same as the one used in Example 1. The difference is in this example, the spacer's thickness is 1.5 mm, and the heat preserving board is filled with ceramic fiber. The ceramic fiber has the hear resistance of 405° C. The thickness of heat preserving board is 40 mm, and the thickness of the stainless-steel is 1.2 mm, the thickness of the heat insulation board is 35 mm.

The procedure provided above prolongs the cleaning cycle by 40%, and the full-package rate of the polyester industrial yarn produced is 99.4%.

EXAMPLE 6

A method for improving the quality of polyester industrial yarn as introduced in this invention, comprising the steps:

(1) Preparation of oiling agent for oiling: mix and stir 2-hydroxymethyl-15-crown-5 and dodecacanol phosphate potassium salt, trimethylolpropane laurate and sodium pentadecyl sulfonate at room temperature, uniformly add to 14# mineral oil and uniformly stir at 55° C. for 1 hours to obtain an oil agent. The amount of each component added is counted by weight as follows: 14# mineral oil is 3 parts, 10 parts of trimethylolpropane laurate, 75 parts of 2-hydroxymethyl-15-crown-5, 14 parts of dodecacanol phosphate potassium salt, 7 parts of sodium pentadecyl sulfonate. The crown ether in the prepared oil agent is 68.80 wt %, and the oil agent has excellent high temperature resistance. The heat loss after heat treatment at 200° C. for 2 hours is 12 wt %. The viscosity of the oil agent is relatively low, and the kinematic viscosity is 28.6 mm$^2$/s at the temperature of (50±0.01)° C. The kinematic viscosity of the emulsion prepared by dissolving the oil agent into water with the concentration of 10 wt % is 0.95 mm$^2$/s. The oil film strength of the oil agent is high, the oil film strength is 126N, and the surface tension of the oil agent is 25.4 cN/cm. The specific resistance is 1.6×10$^8$ Ω·cm. After oiling, the coefficient of static friction (μs) between fiber and fiber (F/F) is 0.255, the coefficient of dynamic friction (μd) is 0.267. After oiling, fiber and metal (F/M) Static friction coefficient (μs) is 0.203, the coefficient of dynamic friction (μd) is 0.330, and the prepared oil agent is disposed in water to be an emulsion having a concentration of 20% by weight when used.

(2) Polyester industrial yarn is prepared by spinning after cooling and oiling the polyester. When cooling, the structure of the device used in slow cooling area is basically the same as the one used in Example 1. The difference is in this example, the spacer's thickness is 2 mm, and the heat preserving board is filled with ceramic fiber. The ceramic fiber has the hear resistance of 405° C. The thickness of heat preserving board is 40 mm, and the thickness of the stainless-steel is 1.2 mm, the thickness of the heat insulation board is 35 mm.

The procedure provided above prolongs the cleaning cycle by 40%, and the full-package rate of the polyester industrial yarn produced is 99.5%.

EXAMPLE 7

A method for improving the quality of polyester industrial yarn as introduced in this invention, comprising the steps:

(1) Preparation of oiling agent for oiling: mix and stir 15-crown ether-5 with potassium lauryl phosphate, trimethylolpropane laurate and sodium hexadecyl sulfonate at room temperature, uniformly add to 15# mineral oil and uniformly stir at 41° C. for 2 hours to obtain an oil agent. The amount of each component added is counted by weight as follows: 15# mineral oil is 8 parts, 20 parts of trimethylolpropane laurate, 100 parts of 15-crown ether-5, 15 parts of potassium lauryl phosphate, 2 parts of sodium hexadecyl sulfonate. The crown ether in the prepared oil agent is 68.97 wt %, and the oil agent has excellent high temperature resistance. The heat loss after heat treatment at 200° C. for 2 hours is 8.5 wt %. The viscosity of the oil agent is relatively low, and the kinematic viscosity is 28.4 mm$^2$/s at the temperature of (50±0.01)° C. The kinematic viscosity of the emulsion prepared by dissolving the oil agent into water with the concentration of 10 wt % is 0.94 mm$^2$/s. The oil film strength of the oil agent is high, the oil film strength is 122N, and the surface tension of the oil agent is 26.8 cN/cm. The specific resistance is 1.8×10$^8$ Ω·cm. After oiling, the coefficient of static friction (μs) between fiber and fiber (F/F) is 0.263, the coefficient of dynamic friction (μd) is 0.268. After oiling, fiber and metal (F/M) Static friction coefficient (μs) is 0.210, the coefficient of dynamic friction (μd) is 0.320, and the prepared oil agent is disposed in water to be an emulsion having a concentration of 13% by weight when used.

(2) Polyester industrial yarn is prepared by spinning after cooling and oiling the polyester. When cooling, the structure of the device used in slow cooling area is basically the same as the one used in Example 1. The difference is in this example, the spacer's thickness is 2 mm, and the heat preserving board is filled with ceramic fiber. The ceramic fiber has the hear resistance of 405° C. The thickness of heat preserving board is 39 mm, and the thickness of the stainless-steel is 1.2 mm, the thickness of the heat insulation board is 33 mm.

The procedure provided above prolongs the cleaning cycle by 39%, and the full-package rate of the polyester industrial yarn produced is 99.6%.

EXAMPLE 8

A method for improving the quality of polyester industrial yarn as introduced in this invention, comprising the steps:

(1) Preparation of oiling agent for oiling: mix and stir 2-hydroxymethyl-12-crown-4 and twelve-tetradecyl phosphate potassium salt, trimethylolpropane laurate and sodium pentadecyl sulfonate at room temperature, uniformly add to 16# mineral oil and uniformly stir at 45° C. for 3 hours to obtain an oil agent. The amount of each component added is counted by weight as follows: 16# mineral oil is 9 parts, 80 parts of 2-hydroxymethyl-12-crown-4, 12 parts of twelve-tetradecyl phosphate potassium salt, 5 parts of sodium pentadecyl sulfonate. The crown ether in the prepared oil agent is 83.33 wt %, and the oil agent has excellent high temperature resistance. The heat loss after heat treatment at 200° C. for 2 hours is 14 wt %. The viscosity of the oil agent is relatively low, and the kinematic viscosity is 30.0 mm$^2$/s at the temperature of (50±0.01)° C. The kinematic viscosity of the emulsion prepared by dissolving the oil agent into water with the concentration of 10 wt % is 0.93 mm$^2$/s. The oil film strength of the oil agent is high, the oil film strength is 127N, and the surface tension of the oil agent is 23.5 cN/cm. The specific resistance is 1.5×10$^8$ Ω·cm. After oiling, the coefficient of static friction (μs) between fiber and fiber (F/F) is 0.262, the coefficient of dynamic friction (μd) is 0.273. After oiling, fiber and metal (F/M) Static friction coefficient (μs) is 0.208, the coefficient of dynamic friction (μd) is 0.328, and the prepared oil agent is disposed in water to be an emulsion having a concentration of 18% by weight when used.

(2) Polyester industrial yarn is prepared by spinning after cooling and oiling the polyester. When cooling, the structure of the device used in slow cooling area is basically the same as the one used in Example 1. The difference is in this example, the spacer's thickness is 2 mm, and the heat preserving board is filled with ceramic fiber. The ceramic fiber has the hear resistance of 405° C. The thickness of heat preserving board is 40 mm, and the thickness of the stainless-steel is 1.2 mm, the thickness of the heat insulation board is 35 mm.

The procedure provided above prolongs the cleaning cycle by 40%, and the full-package rate of the polyester industrial yarn produced is 99.7%.

EXAMPLE 9

A method for improving the quality of polyester industrial yarn as introduced in this invention, comprising the steps:

(1) Preparation of oiling agent for oiling: mix and stir 2-hydroxymethyl-15-crown-5 and dodecyl phosphate potassium salt, trimethylolpropane laurate and sodium dodecyl sulfate at room temperature, uniformly stir at 55° C. for 3 hours to obtain an oil agent. The amount of each component added is counted by weight as follows: 15 parts of trimethylolpropane laurate, 90 parts of 2-hydroxymethyl-15-crown-5, 8 parts of dodecyl phosphate potassium salt, 7 parts of sodium dodecyl sulfate. The crown ether in the prepared oil agent is 81.81 wt %, and the oil agent has excellent high temperature resistance. The heat loss after heat treatment at 200° C. for 2 hours is 10 wt %. The viscosity of the oil agent is relatively low, and the kinematic viscosity is 29.7 mm$^2$/s at the temperature of (50±0.01)° C. The kinematic viscosity of the emulsion prepared by dissolving the oil agent into water with the concentration of 10 wt % is 0.94 mm$^2$/s. The oil film strength of the oil agent is high, the oil film strength is 126N, and the surface tension of the oil agent is 24.8 cN/cm. The specific resistance is 1.8×10$^8$ Ω·cm. After oiling, the coefficient of static friction (μs) between fiber and fiber (F/F) is 0.250, the coefficient of dynamic friction (μd) is 0.264. After oiling, fiber and metal (F/M) Static friction coefficient (μs) is 0.210, the coefficient of dynamic friction (μd) is 0.321, and the prepared oil agent is disposed in water to be an emulsion having a concentration of 10% by weight when used.

(2) Polyester industrial yarn is prepared by spinning after cooling and oiling the polyester. When cooling, the structure of the device used in slow cooling area is basically the same as the one used in Example 1. The difference is in this example, the spacer's thickness is 2 mm, and the heat preserving board is filled with ceramic fiber. The ceramic fiber has the hear resistance of 405° C. The thickness of heat preserving board is 42 mm, and the thickness of the stainless-steel is 1.2 mm, the thickness of the heat insulation board is 38 mm.

The procedure provided above prolongs the cleaning cycle by 43%, and the full-package rate of the polyester industrial yarn produced is 99.6%.

What is claimed is:

1. A method of improving quality of a polyester industrial yarn, comprising
   in a cooling process of making the polyester industrial yarn by spinning a polyester, keeping a vertical height of a slow-cooling chamber unchanged and enlarging a cross-sectional area of the slow-cooling chamber;
   keeping a surface temperature of a spinneret through heat preservation in the slow-cooling chamber; and
   using an oil agent containing 67.30-85.58 wt % of crown ether in an oiling process of making the polyester industrial yarn by spinning the polyester.

2. The method of claim 1, wherein the step of enlarging the cross-sectional area of the slow-cooling chamber comprises
   changing a cross section of the slow-cooling chamber from a circle to a first rectangle while the spinneret connected to the slow-cooling chamber is unchanged.

3. The method of claim 2, wherein
   the slow-cooling chamber is formed by a heat-preserving board and a plurality of spacers; the heat-preserving board is hanged at a bottom of a spinning box; a first hollow chamber is formed in the heat-preserving board and the plurality of spacers are inserted in the first hollow chamber to form a plurality of slow-cooling chambers; and each of the plurality of slow-cooling chambers has one spinneret.

4. The method of claim 3, wherein a filling material in the heat-preserving board is a stainless-steel board with a heat-preserving material having a heat-resistance of 400° C.; a thickness of the heat-preserving board is 30-50 mm, and a thickness of the stainless-steel board is 0.9-1.5 mm;
   the heat-preserving material is a rock wool or a ceramic fiber; and
   a thickness of each of the plurality of spacers is 1.

5. The method of claim 3, wherein
   a plurality of spinnerets in the first hollow chamber are circular spinnerets having a same diameter, and the plurality of spinnerets are concentric and adjacent;
   a cross section of the first hollow chamber is a second rectangle, a long side of the second rectangle is parallel to the circle center line, and a short side of the second rectangle is vertical to the long side;
   a length of the long side is equal to 1.2 times of a total number of diameters of the plurality of spinnerets, and a length of the short side is 1.7 times of a diameter of the spinneret.

6. The method of claim 5, wherein a heat-insulation board is put under the heat-preserving board, and a material of the heat-insulation board is the same as a material of the heat-preserving board;
   a second hollow chamber is formed in the heat-insulation board, and a cross section of the second hollow chamber is the same as the cross section of the first hollow chamber;
   in a position of the second hollow chamber connecting the first hollow chamber, two sides of the cross section of the second hollow chamber overlap with two short sides of the cross section of the first hollow chamber, and the two sides of the cross section of the second hollow chamber is longer than the two short sides of the cross section of the first hollow chamber; and
   a thickness of the heat-insulation board is 25-45 mm.

7. The method of claim 1, wherein
   the oil agent has a thermal weight loss of less than 15 wt % after heat treatment at 200° C. for 2 hours;
   the oil agent has a kinematic viscosity of 27.5-30.1 $mm^2/s$ at $(50\pm0.01)°$ C., and the kinematic viscosity of the oil agent after being disposed in a concentration of 10 wt % is 0.93-0.95 $mm^2/s$;
   an oil film strength of the oil agent is 121-127N;
   a surface tension of the oil agent is 23.2-26.8 cN/cm, and a specific resistance of the oil agent is $1.0\times10^8$-$1.8\times10^8$ $\Omega\cdot cm$;
   after oiling, a static friction coefficient between the polyester industrial yarns is 0.250-0.263, and a dynamic friction coefficient between the polyester industrial yarns is 0.262-0.273;
   after oiling, a static friction coefficient between the polyester industrial yarn and a metal is 0.202-0.210, and a dynamic friction coefficient between the polyester industrial yarn and the metal is 0.320-0.332.

8. The method of claim 7, wherein a crown ether is 2-hydroxymethyl-12-crown-4, 15-crown-5 or 2-hydroxymethyl-15-crown-5;
   the oil agent further comprises a mineral oil, a potassium phosphate salt, a trimethylolpropane laurate and a sodium alkyl sulfonate;
   the mineral oil is one selected from the group consisting of mineral oils of 9#-17#;
   the potassium phosphate salt is a potassium salt of lauryl phosphate, an isomeric tridecyl polyoxyethylene ether phosphate potassium salt or a tetradecyl alcohol phosphate potassium salt;
   the sodium alkyl sulfonate is sodium dodecyl sulfate, sodium pentadecyl sulfonate or sodium hexadecane sulfonate; and
   the oil agent in use is disposed in water to form an emulsion having a concentration of 10-20% by weight.

9. The method of claim 8, wherein the method for preparing the oil agent comprises:
   uniformly mixing the crown other, the potassium phosphate salt, the trimethylolpropane laurate and the sodium alkyl sulfonate to obtaining a first mixture;
   adding the first mixture into the mineral oil and stirring to obtain the oil agent; wherein
   an amount of each of the mineral oil, the trimethylolpropane lauratel, the crown ether, the potassium phosphate salt and the sodium alkyl sulfonate is as follows:
   mineral oil 0-10 parts;
   trimethylolpropane laurate 0-20 parts;
   crown ether 70-100 parts;
   phosphate potassium salt 8-15 parts;
   sodium alkyl sulfonate 2-7 parts;
   the mixing is carried out at a normal temperature, and a temperature of the stirring is 40-55° C., and a time of the stirring is 1 hour to 3 hours.

* * * * *